United States Patent Office 3,223,725
Patented Dec. 14, 1965

3,223,725
PREPARATION OF ESTERS THROUGH THE USE OF FRIEDEL-CRAFTS CATALYSTS
Marion E. Hill, Kensington, Md., assignor to the United States of America as represented by the Secretary of the Navy
No Drawing. Filed May 17, 1956, Ser. No. 585,591
37 Claims. (Cl. 260—471)
(Granted under Title 35, U.S. Code (1952), sec. 266)

This application is a continuation-in-part of my co-pending application Serial No. 324,421, filed December 5, 1952, now abandoned.

The invention described herein may be manufactured and used by or for the Government of the United States of America for governmental purposes without the payment of any royalties thereon or therefor.

This invention relates to an aliphatic esters and a process for producing aliphatic esters. More particularly the invention relates to the production of esters of aliphatic alcohols negatively substituted in the beta position by the reaction of the alcohol with an acid chloride in the presence of a metal halide catalyst.

Aliphatic alcohols substituted in the beta position are difficult to esterify because of their acidic nature caused by the inductive effect of the halogen, nitro groups, etc. substituted for the hydrogen on the carbon in the beta position. Such alcohols are not easily directly esterified by an acid. With acid halides esterification has previously been accomplished only by the fusion of the alcohol and the acid halide at temperatures up to 130° C. for a period up to several hours without a solvent medium. Where a solvent was employed esterification only resulted after prolonged refluxing.

The reaction between the alcohol and the acid halide appears to proceed as follows:

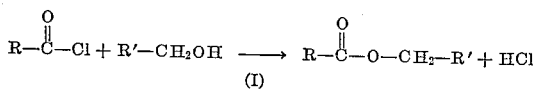

(I)

where R is any organic radical of the aliphatic, aromatic or heterocyclic type and R' is an aliphatic radical substituted in the beta position.

More than one acid group may be contained in the organic acid radical as follows:

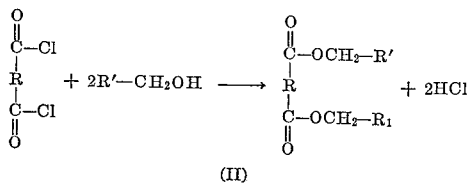

(II)

The esterification reaction is exothermic and where the fusion method is employed heat emission easily becomes uncontrollable. Where the alcohol employed in a nitro substituted alcohol such as trinitroethanol or one of its derivatives the fusion method frequently results in an explosion. When the esterification reaction is carried out in a solvent, prolonged refluxing in the presence of such esterification catalysts as sulfuric acid, phosphoric acid or p-toluenesulfonic acid is required and yields by this method are seldom satisfactory.

It has been discovered that esters of aliphatic alcohols negatively substituted in the beta position may be prepared easily and under mild conditions through the reaction of the alcohol with an acid chloride if a metal halide catalyst is employed. Utilizing this process the very much milder reaction conditions permit control of this otherwise hazardous reaction and allow shorter reaction periods when a solvent is employed without loss of yield.

It is therefore an object of the present invention to provide a new and useful improved process for the preparation of aliphatic esters under mild conditions.

Another object is to provide new and useful improved catalysts for the preparation of aliphatic esters from beta substituted aliphatic alcohols and acid chlorides.

A further object is to provide new and useful aliphatic esters of beta substituted aliphatic alcohols prepared by the improved process.

Other objects and the attendant advantages of this invention will become apparent to those skilled in the art as the invention is disclosed in the following detailed description.

The preferred procedure for carrying out this invention is to slowly add an organic acid chloride to a mixture of the alcohol and catalyst under mild temperature conditions. Any suitable solvent may be employed which does not enter or interfere with the reaction. Chloroform and carbon tetrachloride are the preferred solvents but carbon disulfide, tetrachloroethane and nitrobenzene have been found to be suitable for this purpose.

An alternative procedure is to mix the components of the reaction either in a solvent or with themselves at room temperature or lower and then slowly warm the reaction mixture to such temperature that the reaction is vigorous. In the absence of a solvent warming is usually unnecessary as the reaction proceeds vigorously at room temperature. The temperature at which the reaction is carried out is not critical. The reaction is usually vigorous at temperatures from 25° to 50° C. with only a short period at reflux temperature to complete reaction.

The foregoing esterification is generally applicable to aliphatic alcohols negatively substituted in the beta position of the form:

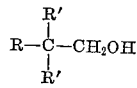

where R is either an $(NO_2)$ group, Cl, Br, F, or an organic aliphatic radical and R' is either an $(NO_2)$ group, Cl, Br or F. The compounds, 2,2,2-trinitroethanol, 2,2-dinitropropanol, 2,2,2-trichloroethanol, 2,2,2-tribromoethanol and 2,2,2-trifluoroethanol are illustrative of these compounds.

As esterifying agent there may be employed the acid chloride of any mono or polybasic acid of the general form shown in Equations 1 and 2 above.

As heretofore stated the catalyst employed may be any one of the metal halides commonly employed in the Friedel-Crafts reaction. These catalysts are well known and comprise the polyhalides of certain metals such as $AlCl_3$, $AlBr_3$, $SbCl_5$, $FeCl_3$, $TeCl_2$, $SnCl_4$, $TiCl_4$, $TeCl_4$, $BiCl_3$, $ZnCl_2$ and $BF_3$. It will be noted, however, that the reactions herein disclosed are not related to the Friedel-Crafts reaction and that these catalysts have not heretofore been used to promote esterification. As may be expected not all these metal halides are equally effective as catalysts and the reaction rate depends in part upon the catalyst employed. In order to determine the relative reactivity of the various metal halide catalysts the following experiment was performed under controlled conditions varying only the catalyst.

Under anhydrous conditions, 2.0 g. (11 millimoles) of trinitroethanol were dissolved in 25 ml. of carbon tetrachloride. Five millimoles of a metal halide catalyst was then added. A solution of 1.40 g. (10 millimole) of benzoyl chloride dissolved in 10 ml. of carbon tetrachloride was added dropwise at reflux temperature over a period of 45 minutes. The rate at which hydrogen chloride was evolved by the reaction was taken as a measure of the rate of the reaction and was determined by sweeping out the HCl, by nitrogen, into water absorption vessels which were titrated with standard sodium hydroxide solution during a reaction period of 5 hours and a flushing period of 2 hours at 20° C.

The carbon tetrachloride solution was cooled to below 0° C. The crystalline material was filtered and treated with dilute hydrochloric acid or water to remove the metal halide. The crude products isolated from these reactions were usually discolored and required treatment with decolorizing carbon during recrystallization from alcohol and water. The results obtained are shown below:

| Catalyst | Yield, percent | Percent Esterification (at end of 1 hr.) |
| --- | --- | --- |
| Aluminum Chloride | 88 | [1] 98 |
| Titanium Tetrachloride | 81 | 87 |
| Antimony Pentachloride | 71 | 69 |
| Ferric Chloride | 72 | 45 |
| Stannic Chloride | 80 | 44 |
| Zinc Chloride | 45 | 15 |
| Mercuric Chloride | 81 | 3 |
| No Catalyst | 3 | 1 |

[1] 45 minutes.

When boron trifluoride was bubbled into the mixture an 80% yield of trinitroethyl benzoate was obtained after a three hour reaction period under the experimental conditions above. It will be understood that the order listed above for the benzoyl chloride-trinitroethanol system does not necessarily apply to other acid chloride-alcohol systems but will vary depending upon the reactants. For instance, ferric chloride is almost as effective as aluminum chloride in catalyzing the reaction between succinyl chloride and trinitroethanol.

In order to determine the effect of temperature and varying amount of catalyst on the reaction rate a series of experiments were conducted in which four grams (22 millimoles) of trinitroethanol were dissolved in 45 ml. of carbon tetrachloride. Crushed anhydrous aluminum chloride was then added and the solution brought to reaction temperature (reflux temperature for 3 experiments and 50°±0.5° C. for 3 experiments). Fumaryl chloride, 1.33 g. (10 millimoles) in 5 ml. of carbon tetrachloride, was added to dropwise over a period of 15 minutes. The amount of hydrogen chloride evolved was determined and after 3 hours the reaction mixture was cooled to 0° C. and flushed for 1 hour with dry nitrogen.

Hexane was added to the cold reaction mixture and the crude product filtered off, treated with ice cold dilute hydrochloric acid and then recrystallized from chloroform and hexane.

Yields of recrystallized bis(trinitroethyl) fumarate were as follows

| Aluminum Chloride | Temp. | Yield, percent |
| --- | --- | --- |
| 0.04 g (1.5% molar eq.) | Reflux | ([1]) |
| 0.13 g (5% molar eq.) | Reflux | 83 |
| 0.40 g (15% molar eq.) | Reflux | 86 |
| 0.40 g (15% molar eq.) | 50° C | 73 |
| 1.33 g (50% molar eq.) | 50° C | 76 |
| 2.66 g (100% molar eq.) | 50° C | 80 |

[1] 1.33g of a mixture of mono and bis esters.

It will be noted that the amount of catalyst was varied from a 1.5% molar equivalent of aluminum chloride per mole of acyl halide group to 100% molar equivalent. The lack of proportionate increase in the rate of reaction confirms the need for only catalytic quantities of the metal halide for useful acceleration of the esterification rate.

The invention may best be understood by reference to the following examples which are presented by way of illustration and are not to be construed as limiting the invention:

*Example 1*

Six millimoles (1.00 g.) of itaconyl chloride and 12 millimoles (2.16 g.) and 0.34 g. excess of 2,2,2-trinitroethanol were mixed at 25° C. Heat was applied and at 45° C. 0.1 g. anhydrous aluminum chloride was added. Evolution of HCl gas was vigorous and after 1¾ hours, temperature of the mixture was increased to 90° momentarily and then cooled. A small amount of alcohol was added to the reaction mixture and a white, powdery crystalline materal crystallized. This was filtered and recrystallized from alcohol and water. Yield of bis 2,2,2-trinitroethyl itaconate, M.P. 74° C., was 95% of crude material and 80% of theoretical of recrystallized water based on weight of itaconyl chloride used.

*Example 2*

One hundredth mole (1.53 g.) of fumaryl chloride and 0.02 mole (3.62 g.) plus 0.18 g. excess of 2,2,2-trinitroethanol were mixed at room temperature. Aluminum chloride (.3 g.) was added. Bubbling and foaming began immediately and HCl gas was evolved. After 5 minutes the reaction suddenly set to a hard, crystalline mass which was removed after wetting with alcohol. The crude product was obtained in 96% yield. It was purified by recrystallization from chloroform and hexane. Pure bis 2,2,2-trinitroethyl fumarate, M.P. 152°, was obtained in 85% yield based on the weight of fumaryl chloride used.

*Example 3*

Fumaryl chloride (.02 mole) was added at room temperature to a carbon tetrachloride solution of .04 mole 2,2,2-trinitroethanol and aluminum chloride (.8 g.) catalyst. As the temperature was raised the reaction became more vigorous and the reaction mixture was held at 70° C. for 3 hours. After refluxing an additional hour the reaction mixture was cooled, the product filtered off, and washed with water. The yield of crude product was 88%. It was recrystallized from chloroform and hexane, and the pure bis 2,2,2-trinitroethyl fumarate was obtained in 71% yield.

*Example 4*

Succinyl chloride (.01 mole) and .02 mole 2,2,2-trintroethanol were dissolved in carbon tetrachloride. One gram of aluminum chloride was added and the reaction mixture refluxed 45 minutes. After cooling to 0° C., the crude product was filtered, washed with dilute iced hydrochloric acid, and recrystallized from alcohol and water. A 90% yield of crude and an 80% yield of pure bis 2,2,2-trinitroethyl succinate M.P. 125° C. was obtained.

*Example 5*

4,4,4-trinitrobutyryl chloride (.02 mole) and .02 mole 2,2,2-trinitroethanol were mixed and then 1.0 gram aluminum chloride was added. For a period of 5 minutes reaction was very vigorous at 25° and was complete after 50° C. for 5 minutes. An iced solution of ammonium chloride was added and the crude product was filtered and washed with water. The yield of crude product was 95%. Recrystallization from alcohol and water gave an 82% yield of 2,2,2-trinitroethyl-trinitrobutyrate (M.P. 92° C.) based on weight of 4,4,4-trinitrobutyryl chloride.

*Example 6*

A solution of 0.02 mole 4,4,4-trinitrobutyryl chloride in carbon tetrachloride was added dropwise to a refluxing solutiion of 0.023 mole 2,2,2-trinitroethanol and 1.0 g. aluminum chloride in 4 parts by weight carbon tetrachloride. After one hour the reaction mixture was cooled to 0° C. and the product filtered off. The crude material was washed with dilute iced hydrochloric acid and recrystallized from alcohol and water. Pure 2,2,2-trinitroethyl-4′,4′,4′-trinitrobutyrate was obtained in 80% yield based on the weight of acid chloride employed.

*Example 7*

Acetyl chloride (0.04 mole) and 0.04 mole plus 8 millimoles excess of 2,2,2-trinitroethanol were dissolved in carbon tetrachloride. Aluminum chloride (0.2 gram) was added and the reaction started immediately. It was complete in 10 minutes when the mixture was brought to reflux and held for 30 minutes. After cooling to −5° C., the product was filtered off and recrystallized from chloroform and pentane. 2,2,2-trinitroethylacetate, M.P. 25°, was obtained in 85% yield based on acetyl chloride used.

*Example 8*

Phthalyl chloride (0.02 mole) and 0.04 plus 8 millimoles excess of 2,2,2-trinitroethanol were dissolved in carbon tetrachloride. Aluminum chloride (0.2 g.) was added and the mixture warmed to 50–60° temperature where it was held for one hour. After cooling to 0° C., the product was filtered off and washed with iced dilute hydrochloric acid. Recrystallization from alcohol and water gave an 830 yield of bis-2,2,2-trinitroethylphthalate, M.P. 125° C., based on weight of phthalyl chloride used.

*Example 9*

At room temperature, 0.26 g. (0.002 mole) crushed anhydrous aluminum chloride was added to a solution of 1.15 g. (0.005 mole) of 3,5-dinitrobenzoyl chloride and 0.90 g. (0.005 mole) of 2,2,2-trinitroethanol in 10 ml. carbon tetrachloride. Reaction occurred on warming and at 55° C. evolution of hydrogen chloride gas was rapid. After one hour at 55° C. the reaction solution was refluxed for 30 minutes and then cooled. The crude product obtained by filtration was slurried with dilute hydrochloric acid, filtered and dried. Recrystallization from alcohol and water gave 1.55 g. (83%) of 2,2,2-trinitroethyl 3,5-dinitrobenzoate, M.P. 138.5° C. Nitrobenzene has been found to be an effective solvent.

*Example 10*

2,4,6-trinitrobenzoyl chloride (5.50 g., 0.020 mole) was dissolved in a solution of 30 ml. nitrobenzene and 0.65 g. (0.005 mole) of crushed aluminum chloride. To this solution was then added 3.70 g. (0.021 mole) of 2,2,2-trinitroethanol. The reaction solution was held at 61° C. for 2 hours and at 70° C. for 3 hours. Upon cooling to room temperature the yellow colored solution was poured into 300 ml. hexane. When the nitrobenzene was dissolved by the hexane, crystallization of the insoluble reaction product occurred. The crude material was separated and dissolved in 200 ml. benzene. The benzene solution was stirred with 100 ml. dilute hydrochloric acid for 15 minutes. Insoluble material that settled out was filtered from the benzene solution which was then stirred with 100 ml. 5% sodium bicarbonate solution for 1½ hours. The benzene layer was separated from the red aqueous solution and evaporated to dryness. The residual crystals were washed with cold aqueous alcohol and then recrystalled from alcohol and water. 2,2,2-trinitroethyl 2,4,6-trinitrobenzoate was obtained in 79.0% yield (6.69 g.), M.P. 134.8–135.4° C. Esters of 2,2-dinitropropanol have also been prepared by the process herein disclosed.

*Example 11*

1.50 g. of 2,2-dinitropropanol-1 was weighed into 4 ml. of chloroform in a large side arm test tube. 2.50 g. of 4,4,4-trinitrobutyryl chloride was added. There was no reaction at room temperature.

The reaction mixture was heated at reflux temperature for 30 minutes but only a small amount of hydrogen chloride evolution could be detected.

The solution was cooled to room temperature and 0.26 g. of crushed anhydrous aluminum chloride was added. Immediately reaction occurred and the temperature rose from 26° C. to 31° C. The reaction vessel was gradually warmed over a period of 30 minutes. At 46° C. the reaction was very vigorous and foamed badly. Evolution of hydrogen chloride subsided in 20 minutes at this temperature and a short period of refluxing completed the reaction.

Upon cooling and evaporation of the solvent, the residue solidified to a firm white soapy mass. The solid was treated with ice cold dilute hydrochloric acid and the crude product broken up into white flocculent particles. The crude 2,2-dinitropropyl 4,4,4-trinitrobutyrate was recrystallized from alcohol and water; yield, 3.05 g. (86%); M.P. 94–95° C.

*Example 12*

7.7 g. of 2,2-dinitropropanol was dissolved in 50 ml. of carbon tetrachloride in a three neck flask equipped with stirrer, condenser, and dropping funnel. 2.6 g. of crushed anhydrous aluminum chloride was added. Several drops of a solution of 4,4,4-trinitrobutyryl chloride were added to the alcohol solution which was then warmed by water bath until a vigorous reaction had started at 60° C. Then the rest of the acid chloride solution was added over a period of an hour at this temperature. Upon completion of the addition, the reaction mixture was refluxed an additional hour to complete the reaction.

After cooling the reaction mixture to 0° C., the crude product was filtered from the carbon tetrachloride and treated with ice cold dilute hydrochloric acid. Recrystallization from alcohol and water gave 14.3 g. of fine, fluffy, white crystals, M.P. 94° C. of 2,2-dinitropropyl-4,4,4-trinitrobutyrate.

*Example 13*

1.33 g. fumaryl chloride was weighed into a large side arm test tube and 4 ml. of chloroform was added; 3.30 g. 2,2-dinitropropanol was dissolved in this solution. No reaction occurred at room temperature (23° C.). 0.65 g. $AlCl_3$ was added whereupon a vigorous reaction ensued. The temperature rose to 36° C. and stayed there 15 minutes.

When the temperature began to drop, a water bath was applied to warm the reaction vessel and 40–45° C. the reaction was vigorous with foaming. This temperature was maintained for 30 minutes and then raised to reflux for a short period to complete the reaction.

After adding hexane until precipitation occurred, the reaction mixture was cooled and the product filtered. The resultant snow white crude product was slurried in iced dilute hydrochloric acid and filtered. Recrystallization from chloroform and hexane gave 3.04 g. (80%) of long transparent needles of bis 2,2-dinitropropyl fumarate, M.P. 85.6–86.2° C.

*Example 14*

1.03 g. n-trinitroethylnitraminoacetyl chloride and 0.52 g. of 2,2-dinitropropanol were melted together at 53° C. in a small reaction flask equipped with gas inlet tube, and a tube leading into a water absorption vessel. The homogeneous melt was cooled to 30° C. and 0.23 g. of crushed anhydrous aluminum chloride was added. The vigorous reaction which followed continued for 20 minutes at 30–35° C. Heat was then applied and the reaction vessel held at 50°–60° C. for 2½ hours. The hydrogen chloride gas evolved was swept out with nitrogen into water absorption vessels. The absorbed hydrogen chloride was titrated at intervals with standard sodium hydroxide. When a stoichiometric amount of hydrogen chloride had been evolved the reaction vessel was cooled and the solid product treated with dilute iced hydrochloric acid, washed with water, and dried. Recrystallization from methyl ethyl ketone gave 0.85 g. (62%) of 2,2-dinitropropyl-n-trinitropthylaminoacetate in the form of fine white crystals, M.P. 143.6° C. with gassing.

*Example 15*

At room temperature 1.56 g. (0.020 mole) of acetyl chloride and 3.00 g. (0.020 mole) of 2,2,2-trichloroethanol were dissolved in 5 ml. of chloroform. Very little reaction was observed. 0.13 g. (0.001 mole) of crushed anhydrous aluminum chloride was added whereupon a vigorous exothermic reaction occured with copious evolution of hydrogen chloride gas. After five minutes 0.59 g. (.003 mole) additional aluminum chloride was added and the reaction continued vigorously for 10 minutes and then subsided. Warming to 45° C. completed the reaction in 20 minutes. The chloroform was evaporated and the residue treated with ice cold dilute hydrochloric acid, extracted with ether, and distilled under vacuum after removal of the ether. 2.75 g. (72%) of 2,2,2-trichloroethyl acetate (B.P. 62°/13 mm.) was obtained.

*Example 16*

2,2,2-trichloroethanol (0.30 g., 0.002 mole) and 0.46 g. (0.002 mole) of 3,5-dinitrobenzoyl chloride were dissolved in 7 ml. carbon tetrachloride. At 26° C. 0.10 g. of crushed anhydrous aluminum chloride was added. A vigorous exothermic reaction began with copious evolution of hydrogen chloride gas. After 5 minutes the reaction subsided and the reaction was warmed to 50°. At this temperature reaction continued vigorously for 20 minutes and then the reaction solution was refluxed for 20 minutes. At the end of this period gas evolution had virtually ceased. The reaction solution was cooled to 0° C. and the crude product was filtered off and treated with iced dilute hydrochloric acid. Recrystallization from alcohol and water gave 0.56 g. of 2,2,2-trichloroethyl-3,5-dinitrobenzoate, M.P. 143–144° C., a yield of 81% based on the acid chloride.

An identical mixture was made up in another reaction vessel except that no aluminum chloride was added. No reaction was observed under the same conditions as the catalyzed reaction. The 3,5-dinitrobenzoyl chloride was recovered quantitatively.

*Example 17*

2,2,2-tribromoethanol (1.85 g., 0.0052 mole) was added to a solution of 1.50 g. (0.005 mole) of 3,5-dinitrobenzoyl chloride in 8 ml. carbon tetrachloride. At room temperature 0.52 g. (0.002 mole) of anhydrous aluminum bromide was added. The solution was warmed to reflux temperature over a period of 30 minutes and held at that temperature for 50 minutes. Evolution of hydrogen chloride gas was vigorous and by the end of the reaction period crystalline material had separated. After cooling to 0° C., the reaction product was filtered off and treated with dilute hydrochloric acid and 5% sodium bicarbonate. The product obtained was recrystallized from alcohol and water to give 2.24 g. 2,2,2-tribromoethyl 3,5-dinitrobenzoate, M.P. 164.2–165° C., a yield of 89% based on tribromoethanol.

*Example 18*

A mixture of 1.40 g. (0.010 mole) of benzoyl chloride and 2.83 g. (0.010 mole) of 2,2,2-tribromoethanol in 2 ml. carbon tetrachloride was warmed to 30° C. Anhydrous aluminum bromide (0.52 g., 0.002 mole) was added. An extremely vigorous reaction ensued with foaming and evolution of heat. After 2 minutes the reaction subsided and the mixture was warmed to 50° and held 20 minutes. Gas evolution virtually ceased. The reaction mixture was cooled to 0° C. After removal of solvent the residual oil and solid was slurried in ice cold dilute hydrochloric acid. This emulsion was extracted with ether and the ether solution treated with sodium bicarbonate, washed with water and dried. The ether was evaporated and the residual oil taken up in chloroform. On cooling the solution to below 20° C. crystallization occurred and 3.5 g. of 2,2,2-tribromoethyl benzoate (90%), M.P. 34° C., was obtained.

*Example 19*

To a solution of 2.00 g. (0.011 mole) of trinitroethanol and 0.78 g. (0.005 mole) of succinyl chloride in 50 ml. carbon tetrachloride, 0.26 g. (0.002 mole) of crushed ferric chloride was added. Hydrogen chloride gas evolution was rapid. The reaction solution was held at 77° C. for an additional 30 minutes and then cooled after adding 10 ml. hexane. The crude product was filtered off, slurried with dilute ice cold hydrochloric acid, and recrystallized from alcohol and water. Bis-2,2,2-trinitroethyl succinate was obtained in 82% yield (1.82 g.), M.P. 126–127° C.

From the foregoing it may be seen that a new process has been disclosed whereby aliphatic esters may be prepared under mild conditions through the reaction of aliphatic alcohols negatively substituted in the beta position with organic acid chlorides in the presence of metal halides as catalysts. By this process a large number of new and useful aliphatic esters have been prepared. Of particular interest are the compounds prepared from the esterification of 2,2,2-trinitroethanol and various organic acid chlorides. It has been found that 2,2,2-trinitroethanol may be easily and economically prepared by the treatment of trinitromethane with formaldehyde. The esterification of this alcohol opens a wide field of compounds which are useful as various types of explosives and propellants. These compounds are of particular interest because of their high oxygen and nitrogen content which indicates that they are powerful explosives which carry within their structure a large portion, if not all, the oxygen necessary for their combustion under low oxygen ambient conditions. Trinitroethyl trinitrobutyrate (TNETB) for example has been prepared using the process herein disclosed and was found to have a sensitivity comparable to that of Pentolite, a crystal density of 1.78 and to have other physical properties which make it useful as a high density castable explosive. When mixed with aluminum this compound has also been used as a high energy underwater explosive. Trinitroethyl trinitrobutyrate (TNETB) also forms a eutectic with one third its weight of bis(2,2,2-trinitroethyl) succinate (BTNES). This eutectic consisting of a 3:1 mixture of TNETB and BTNES melts at 81° C. while TNETB melts at 93° C. and BTNES at 125° C. In this form these compounds are extremely useful as cast explosives. BTNES by itself is a very stable explosive having a crystal density of 1.68 an ignition temperature of 219° C. and showing no change in melting point after heating 6 months at 75° C. It is comparable in impact sensitivity to RDX and tetryl and is useful as a boosting explosive.

Bis(2,2,2-trinitroethyl) fumarate is a very stable explosive giving only 1.6 cc. of gas per gram after 120 hours at 120° C. This compound which has a detonation velocity of 250 meters/sec., an ignition temperature of 227° C. and a crystal density of 1.72 has a sensitivity to impact comparable to Pentolite which makes it useful as a high energy explosive for fragmentation and shaped charges.

Several of the esters prepared by the process of this invention are useful as high energy non-castable explosives for use in fragmentation and shaped charges. Among these are bis(2,2,2-trinitroethyl) phthalate, M.P. 125° C., crystal density 1.62, ignition temperature 267° C., and trinitroethyl acetate, M.P. 25° C.

Other esters prepared by this process are useful as castable explosives. Among these are 2,2,2-trinitroethyl-3,5-dinitrobenzoate, M.P. 138° C., crystal density 1.67, ignition temperature 303° C. which as an impact sensitivity comparable to Composition A and 2,2-dinitropropyl-4,4,4-trinitrobutyrate, M.P. 93° C., crystal density 1.66, ignition temperature 300° C. which has a sensitivity to impact comparable to TNT. Other compounds produced by this method are useful as desensitizers such as 2,2-dinitropropyl fumarate, M.P. 84° C., crystal density 1.60, ignition temperature 269° C. which has an impact sensitivity about that of TNT.

Trinitroethyl benzoate, M.P. 72° C., and bis(2,2-dinitropropyl) succinate, M.P. 84°–85° C., crystal density 1.51 hot bar ignition temperature over 400° C. have an impact sensitivity somewhat lower than TNT have been used as substitutes for that explosive for certain purposes.

Obviously many modifications and variations of the present invention are possible in the light of the above teachings. It is therefore to be understood that within the scope of the appended claims the invention may be practiced otherwise than as specifically described.

I claim:

1. A method of preparing esters of aliphatic alcohols comprising reacting a primary, saturated lower aliphatic alcohol substituted in the beta position with a substituent selected from a group consisting of $NO_2$, Cl, Br, and F with an acid chloride in the presence of a metal halide catalyst of the Friedel-Crafts type said metal halide being present in a quantity ranging from about 1.5 percent to not more than about 100 percent molar equivalent of said acid chloride.

2. A method of preparing esters of aliphatic alcohols comprising reacting a primary, saturated lower aliphatic alcohol substituted in the beta position with a plurality of substituents selected from a group consisting of $NO_2$, Cl, Br, and F with an acid chloride in the presence of a metal halide catalyst of the Friedel-Crafts type said metal halide being present in a quantity ranging from about 1.5 percent to not more than about 100 percent molar equivalent of said acid chloride.

3. A method of preparing esters of aliphatic alcohols compirsing reacting a primary, saturated, lower aliphatic alcohol substituted in the beta position with a plurality of nitro groups with an acid chloride in the presence of a metal halide catalyst of the Friedel-Crafts type said metal halide being present in quantity ranging from about 1.5 percent to not more than about 100 percent molar equivalent of said acid chloride.

4. A method of preparing esters of aliphatic alcohols comprising reacting a primary, saturated, lower beta substituted polynitroaliphatic alcohol with an acid chloride in the presence of a metal halide catalyst of the Friedel-Crafts type said metal halide being present in a quantity ranging from about 1.5 percent to not more than about 100 percent molar equivalent of said acid chloride.

5. A process for the preparation of esters of 2,2,2-trinitroethanol comprising reacting 2,2,2-trinitroethanol with an acid chloride in the presence of a metal halide catalyst of the Friedel-Crafts type said metal halide being present in a quantity ranging from about 1.5 percent to not more than about 100 percent molar equivalent of said acid chloride.

6. A method of preparing esters of 2,2-dinitropropanol comprising reacting the 2,2-dinitropropanol with an acid chloride in the presence of a metal halide catalyst of the Friedel-Crafts type said metal halide being present in a quantity ranging from about 1.5 percent to not more than about 100 percent molar equivalent of said acid chloride.

7. A method of preparing esters of 2,2,2-tribromoethanol comprising reacting 2,2,2-tribromoethanol with an acid chloride in the presence of a metal halide catalyst of the Friedel-Crafts type said metal halide being present in a quantity ranging from about 1.5 percent to not more than about 100 percent molar equivalent of said acid chloride.

8. A method of preparing esters of 2,2,2-trichloroethanol comprising reacting 2,2,2-trichloroethanol with an acid chloride in the presence of a metal halide of the Friedel-Crafts type said metal halide being present in a quantity ranging from about 1.5 percent to not more than about 100 percent molar equivalent of said acid chloride.

9. A process for preparing esters of primary, saturated, alcohols containing up to five carbon atoms, said alcohols being substituted in the beta position with a substituent selected from the group consisting of $NO_2$, Cl, Br and F comprising reacting an alcohol of the type described with a carboxylic acid chloride in the presence of a metal halide catalyst of the Friedel-Crafts type said metal halide being present in a quantity ranging from about 1.5 percent to not more than about 100 percent molar equivalent of said acid chloride.

10. A process of preparing esters of primary, saturated, alcohols containing up to three carbon atoms said alcohols being substituted in the beta position with a substituent selected from the group consisting of $NO_2$, Cl, Br and F comprising reacting an alcohol of the type described with a carboxylic acid chloride in the presence of a metal halide catalyst of the Friedel-Crafts type said metal halide being present in a quantity ranging from about 1.5 percent to not more than about 100 percent molar equivalent of said acid chloride.

11. A process for preparing esters of primary, saturated, beta substituted polynitroalcohols comprising reacting an alcohol selected from a group consisting of ethyl and n-propyl alcohols having a plurality of nitro groups substituted on the beta carbon with a carboxylic acid chloride in the presence of a metal halide catalyst of the Friedel-Crafts type said metal halide being present in a quantity ranging from about 1.5 percent to not more than about 100 percent molar equivalent of said acid chloride.

12. A process for the preparation of bis-2,2,2-trinitroethyl itaconate comprising reacting 2,2,2-trinitroethanol and itaconyl chloride in the presence of aluminum chloride catalyst said aluminum chloride being present in a quantity ranging from about 1.5 percent to not more than about 100 percent molar equivalent of said itaconyl chloride.

13. A new compound bis-2,2,2-trinitroethyl itaconate.

14. A process for the preparation of bis-2,2,2-trinitroethyl fumarate comprising reacting 2,2,2-trinitroethanol with fumaryl chloride in the presence of aluminum chloride catalyst said aluminum chloride being present in a quantity ranging from about 1.5 percent to not more than about 100 percent molar equivalent of said fumaryl chloride.

15. A new compound bis-2,2,2-trinitroethyl fumarate.

16. A process for the preparation of 2,2,2-trinitroethyl succinate comprising reacting 2,2,2-trinitroethanol with succinyl chloride in the presence of aluminum chloride catalyst said aluminum chloride being present in a quantity ranging from about 1.5 percent to not more than about 100 percent molar equivalent of said succinyl chloride.

17. A new compound bis-2,2,2-trinitroethyl succinate.

18. A process for the preparation of 2,2,2-trinitroethyl-4,4,4-trinitrobutyrate comprising reacting 2,2,2-trinitroethanol with 4,4,4-trinitrobutyryl chloride in the presence of aluminum chloride catalyst said aluminum chloride being present in a quantity ranging from about 1.5 percent to not more than about 100 percent molar equivalent of said 4,4,4-trinitrobutyryl chloride.

19. A process for the preparation of 2,2,2-trinitroethyl-acetate comprising reacting 2,2,2-trinitroethanol with acetyl chloride in the presence of aluminum chloride catalyst said aluminum chloride being present in a quantity ranging from about 1.5 percent to not more than about 100 percent molar equivalent of said acetyl chloride.

20. A process for the preparation of bis-2,2,2-trinitroethylphthalate comprising reacting 2,2,2-trinitroethanol with phthalyl chloride in the presence of aluminum chloride catalyst said aluminum chloride being present in a quantity ranging from about 1.5 percent to not more than about 100 percent molar equivalent of said phthalyl chloride.

21. A process for the preparation of 2,2,2-trinitroethyl-3,5-dinitrobenzoate comprising reacting 2,2,2-trinitroethanol and 3,5-dinitrobenzoyl chloride in the presence of aluminum chloride catalyst said aluminum chloride being present in a quantity ranging from about 1.5 percent to not more than about 100 percent molar equivalent of said 3,5-dinitrobenzoyl chloride.

22. A new compound 2,2,2-trinitroethyl-3,5-dinitrobenzoate.

23. A process for the preparation of 2,2,2-trinitroethyl- 2,4,6-trinitrobenzoate comprising reacting 2,2,2-trinitroethanol with 2,4,6-trinitrobenzoyl chloride in the presence of aluminum chloride catalyst said aluminum chloride being present in a quantity ranging from about 1.5 percent to not more than about 100 percent molar equivalent of said 2,4,6-trinitrobenzoyl chloride.

24. A new compound 2,2,2-trinitroethyl-2,4,6-trinitrobenzoate.

25. A process for the preparation of 2,2-dinitropropyl-4,4,4-trinitrobutyrate comprising reacting 2,2-dinitropropanol-1 with 4,4,4-trinitrobutyryl chloride in the presence of aluminum chloride catalyst said aluminum chloride being present in a quantity ranging from about 1.5 percent to not more than about 100 percent molar equivalent of said 4,4,4-trinitrobutyryl chloride.

26. A new compound 2,2-dinitropropyl-4,4,4-trinitrobutyrate.

27. A process for the preparation of bis-2,2-dinitropropyl fumarate comprising reacting 2,2-nitropropanol with fumaryl chloride in the presence of aluminum chloride catalyst said aluminum chloride being present in a quantity ranging from about 1.5 percent to not more than about 100 percent molar equivalent of said fumaryl chloride.

28. A new compound bis-2,2-dinitropropyl fumarate.

29. A process for the preparation of 2,2-dinitropropyl-n-trinitroethylnitraminoacetate comprising reacting 2,2-dinitropropanol with n-trinitroethylnitraminoacetyl chloride in the presence of aluminum chloride catalyst said aluminum chloride being present in a quantity ranging from about 1.5 percent to not more than about 100 percent molar equivalent of said n-trinitroethylnitraminoacetyl chloride.

30. A new compound 2,2-dinitropropyl-n-trinitroethylnitraminoacetate.

31. A process for the preparation of 2,2,2-trichloroethyl acetate comprising reacting 2,2,2-trichloroethanol with acetyl chloride in the presence of aluminum chloride catalyst said aluminum chloride being present in a quantity ranging from about 1.5 percent to not more than about 100 percent molar equivalent of said acetyl chloride.

32. A process for the preparation of 2,2,2-trichloroethyl-3,5-dinitrobenzoate comprising reacting 2,2,2-trichloroethanol with 3,5-dinitrobenzoyl chloride in the presence of aluminum chloride said aluminum chloride being present in a quantity ranging from about 1.5 percent to not more than about 100 percent molar equivalent of said 3,5-dinitrobenzoyl chloride.

33. A process for the preparation of 2,2,2-tribromoethyl-3,5-dinitrobenzoate comprising reacting 2,2,2-tribromoethanol with 3,5-dinitrobenzoyl chloride in the presence of aluminum bromide catalyst said aluminum bromide being present in a quantity ranging from about 1.5 percent to not more than about 100 percent molar equivalent of said 3,5-dinitrobenzoyl chloride.

34. A new compound 2,2,2-tribromoethyl-3,5-dinitrobenzoate.

35. A process for the preparation of 2,2,2-tribromoethyl benzoate comprising reacting 2,2,2-tribromoethanol with benzoyl chloride in the presence of aluminum bromide catalyst said aluminum bromide being present in a quantity ranging from about 1.5 percent to not more than about 100 percent molar equivalent of said benzoyl chloride.

36. A method of preparing esters of aliphatic alcohols comprising reacting stoichiometric quantities of a primary, saturated, lower aliphatic, alcohol, said alcohol being substituted in the beta position with a substituent selected from the group consisting of $NO_2$, Cl, Br and F and an acid chloride in the presence of a metal halide catalyst of the Friedel-Crafts type, said metal halide being present in a quantity ranging from about 1.5 percent to not more than about 100 percent molar equivalent of said acid chloride.

37. Novel compounds selected from the group consisting of bis-2,2,2-trinitroethyl itaconate; bis-2,2,2-trinitroethyl fumarate; 2,2,2-trinitroethyl succinate; 2,2,2-trinitroethyl-3,5-dinitrobenzoate; 2,2,2-trinitroethyl-2,4,6-trinitrobenzoate; 2,2-dinitropropyl-4,4,4,-trinitrobutyrate; bis-2,2-dinitropropyl fumarate; 2,2-dinitropropyl-n-trinitroethyl nitraminoacetate, and 2,2,2-tribromoethyl-3,5-dinitrobenzoate.

References Cited by the Examiner

UNITED STATES PATENTS 2,345,006  3/1944  Ross et al. _____260—475 X

FOREIGN PATENTS 698,138  10/1953  Great Britain.

OTHER REFERENCES

Anhydrous Aluminum Chloride in Organic Chemistry, C. A. Thomas, Reinhold Pub. Corp., New York (1941), pp. 762–3.

Schultheiss: B.I.O.S. Report, HEC 5741, Part I, page 8 (1945), declassified June 25, 1948.

LORRAINE A. WEINBERGER, *Primary Examiner.*

LEON D. ROSDOL, ROGER L. CAMPBELL,
*Examiners.*